(12) United States Patent
Perkins (10) Patent No.: US 9,688,328 B2
(45) Date of Patent: Jun. 27, 2017

(54) COMPACT HOIST FOR OVERHEAD APPLICATIONS

(71) Applicant: Toyota Motor Engineering & Manufacturing North America, Inc., Erlanger, KY (US)

(72) Inventor: Blair C Perkins, Georgetown, KY (US)

(73) Assignee: Toyota Motor Engineering & Manufacturing North America, Inc., Erlanger (KY)

( * ) Notice: Subject to any disclaimer, the term of this patent is extended or adjusted under 35 U.S.C. 154(b) by 365 days.

(21) Appl. No.: 14/326,498

(22) Filed: Jul. 9, 2014

(65) Prior Publication Data

US 2016/0009325 A1    Jan. 14, 2016

(51) Int. Cl.
| | | |
|---|---|---|
| *B65G 47/90* | (2006.01) | |
| *B62D 65/18* | (2006.01) | |
| *B66C 1/02* | (2006.01) | |
| *B66C 17/04* | (2006.01) | |

(52) U.S. Cl.
CPC ............ *B62D 65/18* (2013.01); *B66C 1/0243* (2013.01); *B66C 1/0256* (2013.01); *B66C 17/04* (2013.01)

(58) Field of Classification Search
CPC .... B66C 1/00; B66C 1/02; B66C 1/10; B66C 1/42; B66C 1/62; B66C 7/02; B66C 7/08; B66C 9/02; B62D 65/18
USPC .............. 414/626, 749.1, 749.4, 627, 752.1; 294/86.41; 403/111
See application file for complete search history.

(56) References Cited

U.S. PATENT DOCUMENTS

| | | | | |
|---|---|---|---|---|
| 2,933,198 A | * | 4/1960 | Firestone ............... | A61B 6/102 187/250 |
| 3,033,381 A | * | 5/1962 | Noble .................... | B66C 13/00 212/319 |
| 3,593,980 A | | 7/1971 | McHenry | |
| 3,773,296 A | | 11/1973 | McKendrick | |
| 3,807,697 A | | 4/1974 | Cotreau et al. | |
| 4,110,596 A | * | 8/1978 | Okamoto ............... | B23K 37/02 212/319 |
| 4,557,659 A | * | 12/1985 | Scaglia .................. | B65G 47/91 254/270 |
| 4,658,971 A | | 4/1987 | Kornely | |

(Continued)

*Primary Examiner* — Michael McCullough
*Assistant Examiner* — Mark Hageman
(74) *Attorney, Agent, or Firm* — Christopher G. Darrow; Darrow Mustafa PC (57) ABSTRACT

A compact overhead traveling hoist system for transferring product elements from a remote marshalling area to an assembly line work station includes an elevated rail system with a fixed longitudinally extending runway rail and a laterally extending bridge rail which is displaceable along the runway rail. A rail trolley is carried for controlled bi-directional displacement along the bridge rail. A hoisting device is carried by the rail trolley and includes a base member, an object grappler carried with the base member operative to selectively engage, transport and release product elements between the marshaling area and the work station, a linearly expandable structure coupling the rail trolley and the base portion, and a hoist drive operative for raising and lowering the base portion/object grappler. A controller includes assembly line work station operator input control devices located on the object grappler to control all aspects of the operation of the hoist system.

20 Claims, 6 Drawing Sheets

(56) References Cited

U.S. PATENT DOCUMENTS

| | | | | |
|---|---|---|---|---|
| 4,708,574 A | * | 11/1987 | Conboy | B21C 47/242 |
| | | | | 294/67.5 |
| 4,724,944 A | * | 2/1988 | Koshigai | B62D 65/18 |
| | | | | 104/172.4 |
| 5,170,995 A | | 12/1992 | Bitsch et al. | |
| 5,406,697 A | * | 4/1995 | Busisi | B62D 65/06 |
| | | | | 29/721 |
| 5,611,522 A | | 3/1997 | Zaguroli, Jr. | |
| 5,765,703 A | | 6/1998 | Shiwaku | |
| 5,791,861 A | * | 8/1998 | Seelig | B65G 47/91 |
| | | | | 212/276 |
| 5,941,678 A | * | 8/1999 | Saito | B61B 3/00 |
| | | | | 414/626 |
| 6,386,513 B1 | | 5/2002 | Kazerooni | |
| 7,226,264 B2 | | 6/2007 | Eggleston et al. | |
| 7,756,601 B1 | | 7/2010 | Van Dyke et al. | |
| 7,896,324 B2 | * | 3/2011 | Okazaki | B62D 65/18 |
| | | | | 269/17 |
| 2004/0189030 A1 | | 9/2004 | Briggs, Jr. et al. | |
| 2005/0079041 A1 | * | 4/2005 | Campbell | B66C 13/06 |
| | | | | 414/626 |
| 2006/0180564 A1 | | 8/2006 | Keppel | |
| 2010/0119345 A1 | * | 5/2010 | Chang | H05K 13/0408 |
| | | | | 414/752.1 |
| 2014/0263141 A1 | * | 9/2014 | May | B66C 23/62 |
| | | | | 212/242 |

* cited by examiner

COMPACT HOIST FOR OVERHEAD APPLICATIONS

TECHNICAL FIELD

The present disclosure relates to hoisting, and particularly to overhead hoisting devices employed in manufacturing processes.

BACKGROUND

Various types of hoisting devices are known, the architecture of which varies as a function of loads to be lifted and the environment in which the hoisting device is to be employed. Hoisting devices are often employed in industrial applications to lift and move machinery, conveying materials, and other equipment and articles that may be too large or too heavy for an individual to lift by hand. In a particular application, hoisting devices may be used to move materials from staging areas to an appointed location within a converting process or manufacturing facility.

A class of material handling systems called balancers consists of a motorized take-up pulley, a line that wraps around the pulley as the pulley turns, and an end-effector that is attached to the end of the line. The end-effector has components that connect to the load being lifted. The pulley's rotation winds or unwinds the line and causes the end-ffector to lift or lower the load connected to it. In this class of material handling systems, an actuator generates an upward life force in the line that exactly equals the gravity force of the object being lifted so that the tension in the line balances the object's weight. Therefore, the only force an operator must impose to maneuver the object is the object's acceleration force. This force can be substantial if the object's mass is large. Therefore, the heavy object's acceleration and deceleration is limited by the operator's physical strength.

There are two ways of creating a lift force in the line that exactly offsets the weight of a load. First, if the system is pneumatically powered, air power is adjusted so that the lift force equals the load weight. Second, if the system is electrically powered, a variable voltage level is applied to a system amplifier to generate a lift force that equals the load weight.

Product fabrication facilities frequently employ assembly lines wherein product components and subassemblies are pre-positioned or staged along the assembly line adjacent designated work stations. Small or lightweight components/subassemblies can be manually lifted and added to the developing product traversing the assembly line by an operator assigned to an associated work station. Heavy or cumbersome components/subassemblies, however, frequently require use of a mechanical aid such as a hoisting device.

Figure 1:
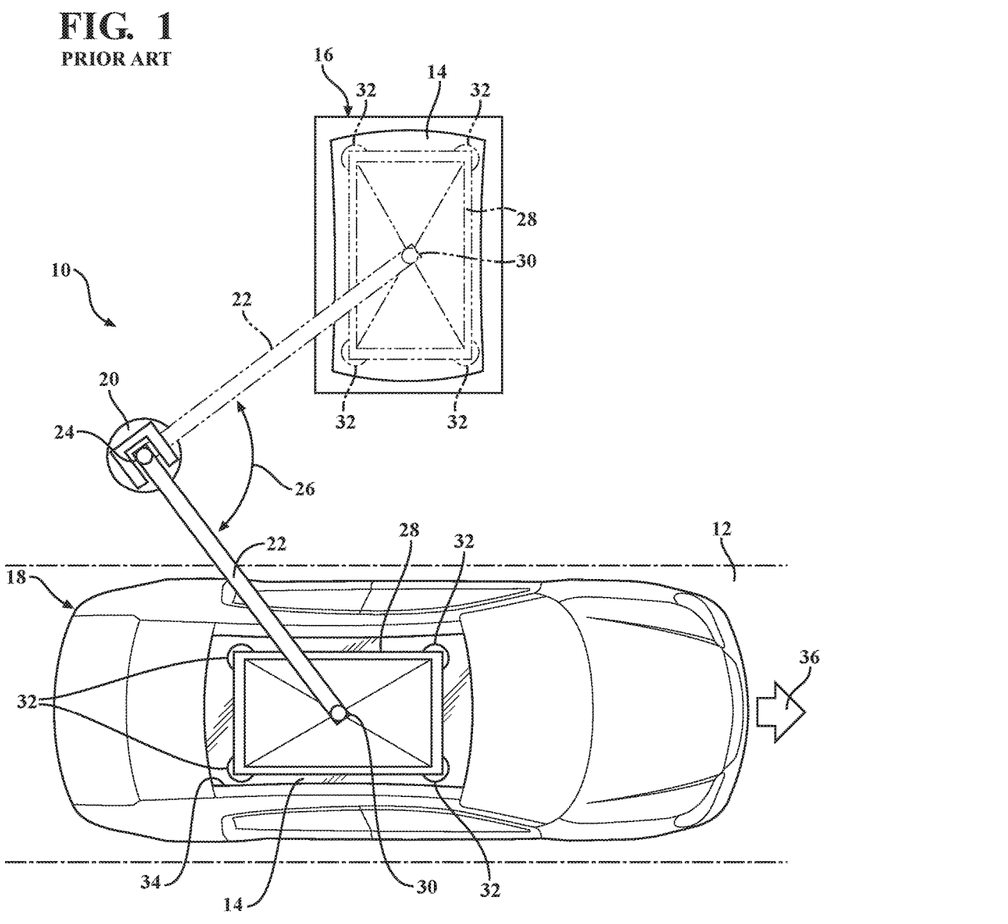
FIG. 1 is an overhead view of a prior pick-and-place system located adjacent a manufacturing (e.g., an automobile) assembly line for retrieving large panels from a nearby supply pallet and serially positioning each panel on an associated product (e.g., an automobile body) sequentially progressing along the assembly line.

FIG. 1 illustrates an overhead view of a prior pick-and-place system 10 located adjacent a manufacturing (e.g., an automobile) assembly line 12 for retrieving large panels 14 (e.g., glass panoramic moon roof panels) from a nearby supply pallet 16 and serially sequentially depositing each panel 14 on an associated product 18 (e.g., an automobile body) progressing along the assembly line 12. The pick-and-place system 10 includes a floor-mounted base portion 20 which supports an elongated, cantilevered beam 22 extending therefrom. The pick-and-place system 10 is controllable to rotate about a vertical axis 24 between a retrieval position, illustrated in phantom, and a release position, illustrated in solid line. The pick-and-place system 10 has a range of motion illustrated by an arrow 26. A grappling mechanism 28 depending from a free end 30 of the elongated, cantilevered beam 22 employs grasping elements 32 (e.g., suction cups) to self-engage with the panel 14 atop a stack of panels 14 located on the supply pallet 16. In application, once the grappling mechanism 28 has engaged the topmost panel 14, the panel 14 is lifted vertically and translated arcuately horizontally to merge with an approaching product 18 as indicated by an arrow 36. Once the panel 14 registers with an intended design location opening 34 (e.g., an opening formed in an automobile body roof), it is lowered into its final design position within the opening 34 and released by the grappling mechanism 28, which then returns to the retrieval position.

When employed in applications such as illustrated in FIG. 1, the pick-and-place system 10, although effective in performing its basic intended application, can be costly to produce and to operate. Such pick-and-place systems 10 tend to require a large foot-print within the associated manufacturing facility housing the assembly line 12 and can necessitate undue elongation of the assembly line 12 to safely accommodate adjacent prior and succeeding work stations. Furthermore, coordination and control of the complex three-axis motion of the grappling mechanism 28 vis-à-vis both the positioning of the supply pallet 16 and the product 18 transiting the assembly line 12 can require equally complex control technology and operator overview/intervention. Finally, such pick-and-place systems 10 may not permit multi-axis micro-positioning/adjustment of the panel 14 by an operator as the panel 14 approaches a final design intent position, which is often required by unit-to-unit variances, time-induced wear on production equipment, and the like. Even when such pick-and-place systems 10 permit limited operator micro-positioning, the length of the elongated cantilevered beam 22 and the inherent inertia of the pick-and-place system 10 can render such operator micro-positioning unduly physically taxing over an extended period of time (e.g., a work shift).

An overhead traveling carriage supporting a hoisting device can enable an operator to repeatedly lift heavy or cumbersome components/subassemblies and serially move each component/subassembly laterally from a staging area to a work station on the assembly line for installation on the developing product. Such overhead hoisting systems may however, not provide adequate sway stability, requiring the operator to wait for lateral swaying of the suspended component/subassembly to subside. Another disadvantage of conventional hoisting devices is that accurate placement of the component/subassembly on the developing product is difficult when position adjustment of the component/subassembly is only possible in two-degrees of motion (e.g., hoist or vertical) direction and travel (e.g., carriage or lateral) direction, and the suspended component/subassembly can potentially require final adjustment spatially in six degrees of motion (e.g., hoist or vertical; carriage or lateral; longitudinal; roll; pitch; and yaw) directions. As a final complication, the developing product may be continuously moving along the assembly line (i.e., presenting a "moving target"), requiring precise timing of the placement of the component/subassembly on the developing product as it passed through the work station.

SUMMARY

The present disclosure describes a compact, lightweight overhead traveling hoist system for placing large panels (e.g., glass panoramic moon roof panels) on a vehicle body traversing an automobile assembly line. The hoist system operates in a small vertical envelope, yet requires a long range of travel to reach the supply rack of panels adjacent the assembly line. The hoist system employs a simple, scissors-type structure to ensure rigidity while minimizing weight. Lifting/lowering is effected by a double pulley (i.e., one fixed and one movable)—cable system controlled by a pneumatic load balancer. The hoist system includes an inertia-activated anti-fall feature and a rotation-limited turntable to assist precise manual placement of the panel on an underlying vehicle body.

According to an embodiment of the disclosure, an overhead traveling hoist system for supplying product elements to an assembly line work station includes a rail trolley movably engaged with an elongated elevated rail system for controlled bi-directional longitudinal displacement and controlled bi-directional lateral displacement. A hoisting device is carried with the rail trolley and includes a base member and an object grappler carried with the base member. The object grappler is operable to engage and release a product element at an assembly line work station. A linearly expandable structure couples the rail trolley and the base portion, and a hoist drive operates for raising and lowering the base portion/object grappler. A controller includes assembly line work station operator input control devices disposed on the base member/object grappler, wherein the operator input control devices are operable to effect the controlled bi-directional longitudinal and lateral displacement of the rail trolley, operation of the hoist drive and operation of the object grappler.

According to another embodiment of the disclosure, an overhead traveling hoist system for supplying product elements to an assembly line work station as part of an automated manufacturing process includes an elevated rail system including at least one relatively fixed longitudinally extending runway rail and a laterally extending bridge rail carried for controlled bi-directional displacement along the runway rail. A rail trolley is movably engaged for bi-directional displacement along the laterally extending bridge rail. A hoisting device is carried with the rail trolley and includes a base member and an object grappler carried with the base member. The object grappler is operable to engage and release a product element at an assembly line work station. A linearly expandable structure couples the rail trolley and the base portion, and a hoist drive operates for raising and lowering the base portion/object grappler. A controller includes assembly line work station operator input control devices disposed on the base member/object grappler, wherein the operator input control devices are operable to effect the controlled bi-directional longitudinal and lateral displacement of the rail trolley, operation of the hoist drive and operation of the object grappler.

These and other features and advantages of the disclosure will become apparent upon reading the following specification, which, along with the drawings, describes alternative embodiments of the disclosure in detail.

BRIEF DESCRIPTION OF THE DRAWINGS

The present apparatus will now be described, by way of example, with reference to the accompanying drawings, in which.

Although the drawings represent embodiments of the present apparatus and method, the drawings are not necessarily to scale and certain features may be exaggerated in order to illustrate and explain the present disclosure. The exemplification set forth herein illustrates an embodiment of the apparatus and method, in one form, and such exemplifications are not to be construed as limiting the scope of the present apparatus and method in any manner.

DETAILED DESCRIPTION

The present disclosure is embodied as a compact, lightweight overhead hoist system for placing large panels (e.g., glass panoramic moon roof panels) on a vehicle body traversing an automobile assembly line. The hoist systems has a hoisting device carried by overhead crane rails on a bridge gantry system. A-vacuum-cup-based end effector or object grappler is supported by a pneumatic load balancer to provide a gravity operated hoist system. A scissor-type mechanism or linearly expandable structure removes "swing" from the object grappler, allowing an operator to push, pull, or otherwise manually maneuver the hoisting device along the bridge gantry system. The entire hoist system folds into a very compact package and extends out providing an extended reach. Also, the use of a pneumatic load balancer prevents downward force being applied to the glass panoramic moon roof panel during the assembly process on the assembly line.

The hoist system operates in a small vertical envelope, typically a 2 foot to 7 foot envelope, yet requires a long range of travel to reach the pallet or rack of panels adjacent the assembly line. The hoist system employs a simple, scissors-type structure to ensure rigidity, while minimizing weight. Lifting and lowering is effected by a double pulley (i.e., one fixed and one movable) cable system controlled by the pneumatic balancer. The hoist system includes an inertia-activated anti-fall feature and a rotation-limited turntable to assist precise manual placement of the panel on an underlying vehicle body.

The present disclosure describes a scissor mechanism and a movable pulley coupled to a pneumatic load balancer. This arrangement permits a very light hoisting device with structural rigidity. The movable pulley allows use of a small pneumatic load balancer due to the doubling of pull force and provides improved control due to a 50% speed reduction over balancer speed. The design is simple and inexpensive to produce.

Although the present apparatus can conceivably be employed in any number of manufacturing assembly line scenarios, it will be described in the context of an automobile assembly line for purposes of clarity of understanding and is not to be considered as limited in that sense.

As illustrated in FIG. 1, known pick-and-place systems 10 are typically located adjacent a manufacturing assembly line 12 and employ linear guides or an elongated cantilevered beam 22 having an arcuate range of motion illustrated by the arrow 26 for transferring large panels 14 from the supply pallet 16 to the associated product 18 traversing the assembly line 12. Use of such systems can be problematic in certain manufacturing environments inasmuch as they tend to be large and cumbersome when employed to lift and/or transport a large part and can be physically demanding to operate over an extended period.

Figure 2:
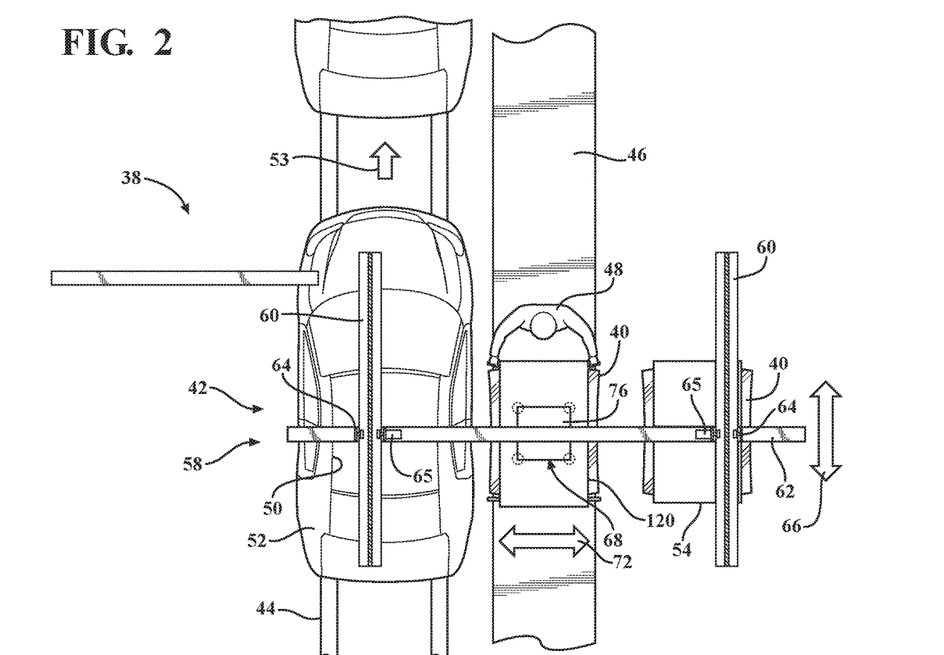
FIG. 2 is an overhead view of a lightweight overhead traveling hoist system employed at a work station of a manufacturing (e.g., an automobile) assembly line for retrieving large product elements (e.g., glass panoramic moon roof panels) from an adjacent supply pallet and serially positioning each product element on an associated product (e.g., an automobile body) sequentially progressing along the assembly line.
Figure 3:
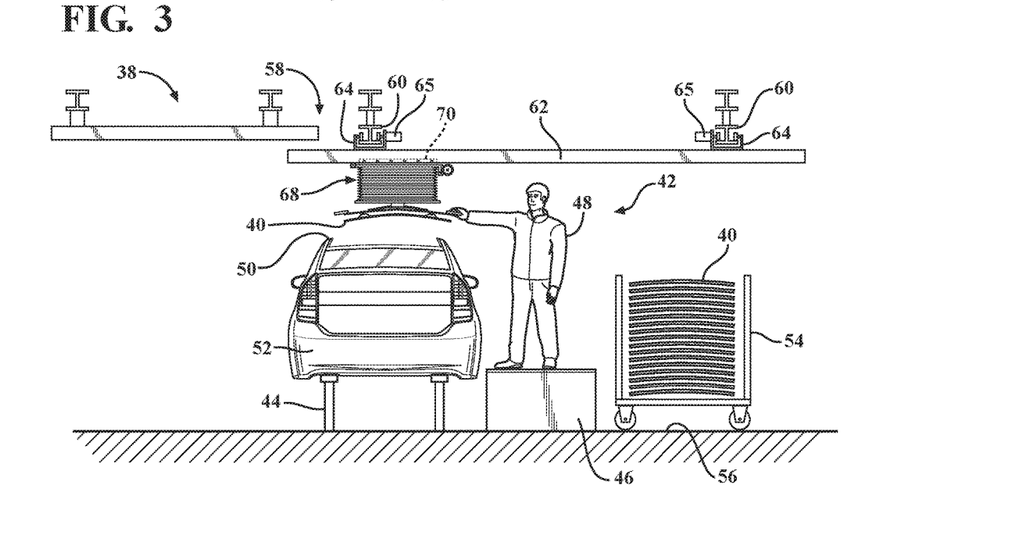
FIG. 3 is a view of the hoist system at a work station of the assembly line environment of FIG. 2 from a first person perspective.

Referring to FIGS. 2 and 3, a lightweight overhead traveling hoist system 38 is configured within a manufacturing facility for supplying product elements (e.g., glass panoramic moon roof panels) 40 to a work station 42 disposed along an automated manufacturing assembly line (e.g., an automobile assembly line) 44. An elevated operator work platform 46 is disposed adjacent the assembly line 44 to enable an operator 48 to reach the roof structure 50 of an automobile body 52 traversing the assembly line 44 as it passes through the work station 42 in a direction indicated by an arrow 53. A rack or pallet 54 located in a marshalling area 56 adjacent the operator work platform 46 contains a supply of product elements 40 and enables the operator 48 to conveniently access the next-available (i.e., topmost) product element 40 from the pallet 54.

For purposes of providing non-limiting definition and to enable clear understanding of the present disclosure, "longitudinal" means parallel to the direction of the assembly line 44 or Z axis, "lateral" means normal to the direction of the assembly line 44 or X axis, and "vertical" means along the Y axis.

The overhead traveling hoist system 38 includes an elongated elevated rail system 58 disposed above the work station 42. The elevated rail system 58 includes a pair of laterally spaced apart longitudinally extending runway rails 60 fixedly mounted within the manufacturing facility. A differing number of runway rails 60 can be employed as required by a given application. The elevated rail system 58 further includes a laterally extending gantry or bridge rail 62 extending between the runway rails 60 and is supported by the runway rails 60 through intermediate runway rail trolleys 64. The runway rail trolleys 64 are either bearing mounted or provided with a powered traction drive device 71 to facilitate operator controlled repositioning of the bridge rail 62 longitudinally along the runway rails 60 as indicated by a bi-directional arrow 66.

Figure 4:
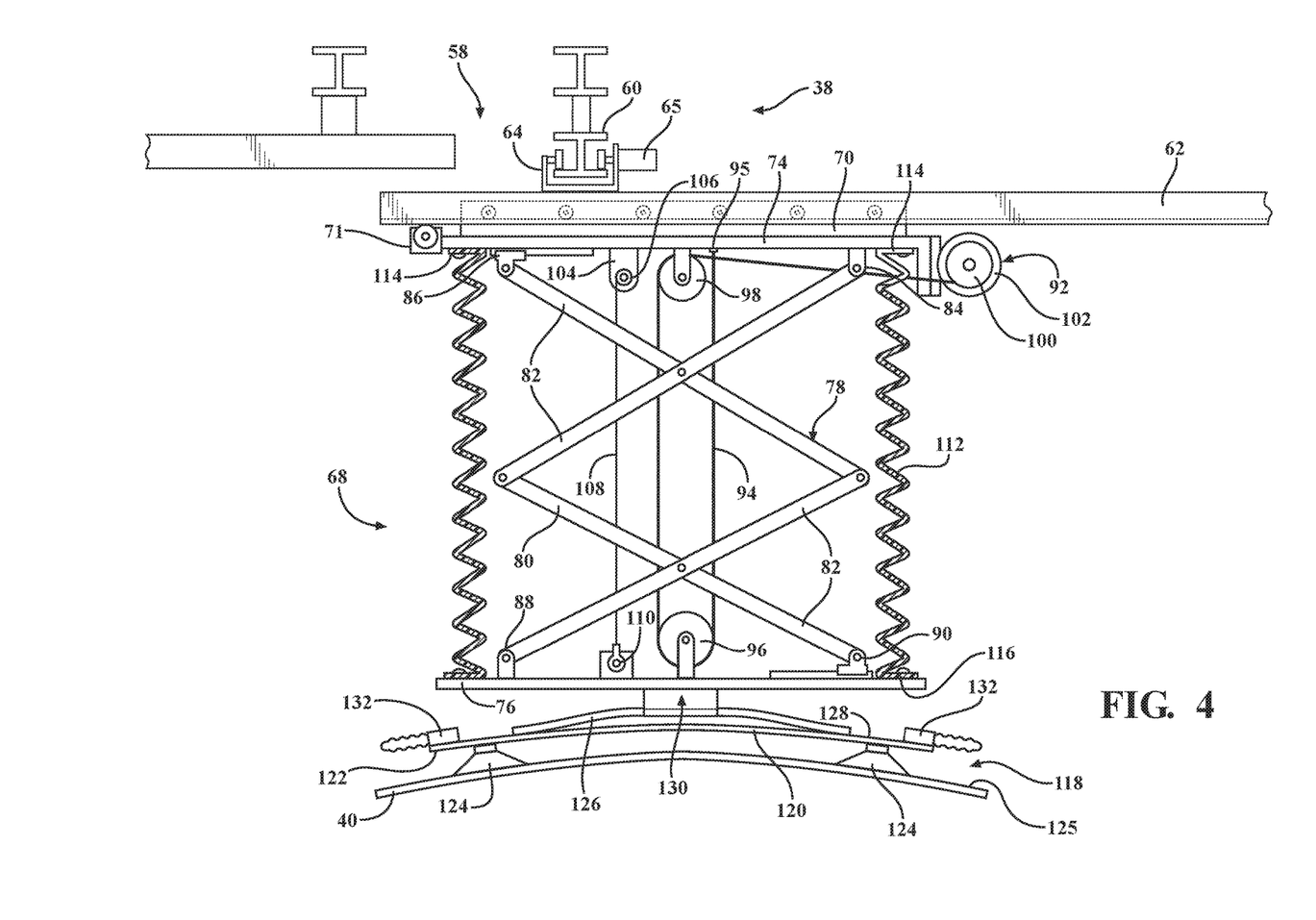
FIG. 4 is a plan view of the hoist system of FIG. 3, including details of runway and bridge rail trolleys adapted for traveling on an overhead rail system and an operator controlled hoisting device and object grappler carried by the bridge rail trolley, on an enlarged scale.

Referring to FIGS. 2-4, a hoisting device 68 is supported by the bridge rail 62 through an intermediate bridge rail trolley 70. As in the case of the runway rail trolleys 64, the bridge rail trolley 70 is either bearing mounted or provided with a powered traction drive device 71 to facilitate operator controlled repositioning of the hoisting device 68 along the bridge rail 62 as indicated by a bi-directional arrow 72. The hoisting device 68 includes a header 74 affixed to the bridge rail trolley 70. A base member 76 is suspended beneath the header 74 and is supported by an intermediate linearly expandable structure 78. The linearly expandable structure 78 forms at least one accordion linkage 80 including any number of pivotally coupled links 82 that are configured to linearly expand or contract in a scissor-like manner. Each linkage 80 is relatively rigid in the plane in which it rests, rendering the entire linearly expandable structure 78 relatively rigid as well, while allowing it to freely expand and contract vertically. The upper end of the linearly expandable structure 78 is connected to the header 74 by a fixed joint 84 and a sliding joint 86. Similarly, the lower end of the linearly expandable structure 78 is connected to the header 74 by a fixed joint 88 and a sliding joint 90.

A hoist drive 92 operable to controllably raise and lower the base member 76 includes a flexible member (e.g., a wire rope) 94 connected at one end 95 to the header 74, and successively dressed around a movable pulley 96 carried by the base member 76, dressed around a fixed pulley 98 carried by header 74, and having the other (e.g., termination) end wound around a motorized drum 100 driven by a pneumatic load balancer 102. The double pulley arrangement serves to reduce loading of the flexible member 94, enabling it to be reduced in size. The double pulley arrangement also serves to reduce the controlled rate of assent/descent of the base member 76 during operation of the hoist drive 92.

Referring to FIG. 4, the hoisting device 68 includes an inertia-activated, self-engaging clutch/brake 104 mounted to the header 74. The self-engaging clutch/brake 104 includes a rotary drum 106 having a flexible member (e.g., a wire rope) 108 wound thereabout. The flexible member 108 extends downwardly from the rotary drum 106 and terminates in a clevis joint 110 or similar device affixed to the base member 76. The self-engaging clutch/brake 104 functions as a redundant stop for the base member 76 and stops further deployment of the flexible member 108 whenever downward displacement of the base member 76 exceeds preset displacement distance, velocity and/or acceleration limits.

An accordion-type canopy 112 has an upper end 114 affixed to the header 74 and a lower end 116 affixed to the base member 76. The accordion-type canopy 112 expands and contracts upon vertical movement of the base member 76. The linearly expandable structure 78, the flexible member 94 of the hoist drive 92 and the flexible member 108 of the self-engaging clutch/brake 104 all extend through an enclosure formed by the accordion-type canopy 112 which may avoid pinch-hazards and air-borne contamination interfering with the operation of the hoisting device 68.

An object grappler 118 is carried by the base member 76 of the hoisting device 68. The object grappler 118 functions, in application with the overhead traveling hoist system 38, to establish intimate contact with a palletized product element 40, to securely mechanically engage the product element 40, to lift and transport the product element 40 to the work station 42, to place the product element 40 in its design intent location on an automobile body 52 traversing the assembly line 44, and to release and withdraw from the product element 40 to begin a subsequent product assembly cycle.

The object grappler 118 includes a frame member 120 having a lower surface 122 supporting an array of product element engagement devices (e.g., pneumatically actuated suction cups) 124. The engagement devices 124 are preferably resilient, enabling each engagement device 124 of the array to conform to an underlying exposed upper surface portion 125 of the product element 40. An elongated resilient beam 126 has its opposed ends attached at spaced locations on an upper surface 128 of the frame member 120. A center portion of the resilient beam 126 is interconnected to the base member 76 by a support bearing assembly 130. In application, the resilient beam 126 flexes to permit the frame member 120 to pitch and roll as required to align or conform the lower surface 122 with the surface portion 125 of the product element 40 being engaged by the object grappler 118. Redundant sets of work station operator input control devices (e.g., electrical and/or pneumatic switches, control devices and operator readout/signal devices) 132 are mounted on the upper surface 128 of the frame member 120 and are positioned about the perimeter of the of the frame member 120 to enable control by the operator 48 from various positions on the operator work platform 46. The operator input control devices 132 are also configured to form ergonomically efficient hand holds for manually manipulating the hoisting device 68 and can avoid the need for the operator 48 to touch or directly physically contact the product element 40 during the operation of the overhead traveling hoist system 38. The multiplicity and distribution of work station operator input control devices 132 enable the operator 48 to easily and conveniently access at least one, or preferably two, operator input control devices 132 at any relative orientation about the perimeter of the object grappler 118.

Figure 5:
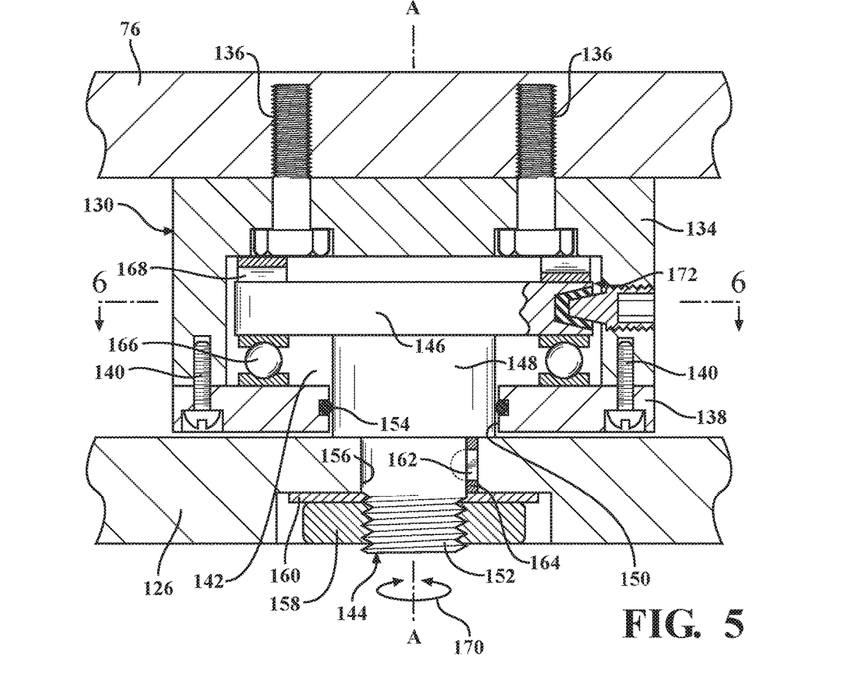
FIG. 5 is a broken, cross-sectional view of a support bearing assembly interconnecting the operator controlled hoisting device and object grappler of FIG. 4 to provide limited relative freedom of rotation there between on a further enlarged scale.
Figure 6:
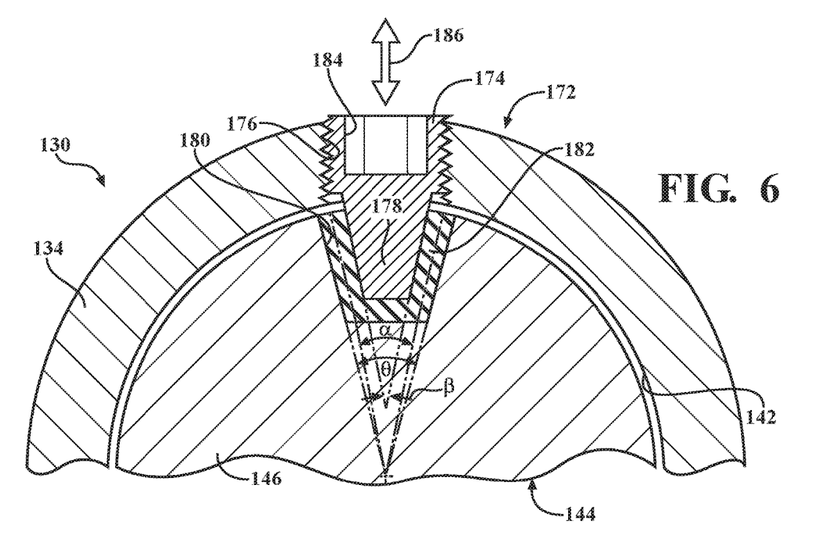
FIG. 6 is a broken, cross-sectional view of the support bearing assembly taken on lines 6-6 of FIG. 5 on a still further enlarged scale.

Referring to FIGS. 5 and 6, details and function of the support bearing assembly 130 are illustrated. The support bearing assembly 130 includes a robust case member 134 affixed to the underside of the base member 76 of the hoisting device 68 by bolts 136 or other suitable fasteners. The threaded output shaft 152 is thus locked for rotation with the base member 76. A closure member 138 is affixed to the case member 134 by screws 140 or other suitable fasteners to define a cylindrical cavity 142. The support bearing assembly 130 further includes a stepped output member 144 forming a large diameter end portion 146 disposed within the cylindrical cavity 142, an intermediate diameter center portion 148 extending through a passageway 150 in the closure member 138 and a small diameter threaded output shaft 152 extending outwardly from the closure member 138. The passageway 150 functions as a radial guide for the stepped output member 144 and supports a seal 154 against environmental contaminants. The threaded output shaft 152 also extends through a passageway 156 formed in the resilient beam 126 of the object grappler 118 and is retained in assembly therewith by a nut 158 and washer 160 or other suitable fastener. The stepped output member 144 is locked for rotation with the resilient beam 126 by a key 162 and a slot 164 in the passageway 156.

As best viewed in FIG. 5, a ball bearing assembly 166 is disposed between the lower radial surface of the large diameter end portion 146 of the stepped output member 144 and the upper surface of the closure member 138 to support the downward load forces imposed by the object grappler 118 and any product element 40 it may be carrying. A wave washer 168 is disposed between the upper radial surface of the large diameter end portion 146 of the stepped output member 144 and the lower end wall surface of the case member 134 to support against any axial reaction forces resulting from unloading and any product element 40 from the object grappler 118.

Thus constructed, a subassembly consisting of the base member 76 of the hoisting device 68 and the case member 134 of the support bearing assembly 130 is free to rotate about an axis A-A relative to a subassembly consisting of the resilient beam 126 of the object grappler 118 and the stepped output member 144 of the support bearing assembly 130, as illustrated by an arrow 170, unless such rotation is otherwise limited.

As best viewed in FIG. 6, a rotation limiting device 172 for limiting relative rotation between the base member 76 of the hoisting device 68 and the resilient beam 126 of the object grappler 118 is illustrated. The rotation limiting device 172 consists of a plug 174 threadably disposed within a through bore 176 in case member 134 in axial alignment with the large diameter end portion 146 of the stepped output member 144. The plug 174 has an integrally formed tapered pin 178 extending radially inwardly within the cylindrical cavity 142 and entering a radially tapered cavity 180 formed in the outer circumferential surface of the large diameter end portion 146 of the stepped output member 144. The tapered pin 178 is formed with a nominal radial taper designated "$\beta$" and the tapered cavity 180 is formed with a nominal radial taper designated "$\theta$", wherein $\theta > \beta$.

A resilient insert 182 substantially fills the void between the opposed outer surface of the tapered pin 178 and the inner surface of the tapered cavity 180, and provides a self-centering feature between the relative rotational positions of the case member 134 and the stepped output member 144. When the operator 48 manually applies a torsion load to the object grappler 118 to effect precise rotational alignment between a product element 40 and an opening (e.g., in the roof structure 50) in an underlying automobile body 52, the tapered pin 178 will be momentarily rotationally displaced within the tapered cavity 180 compressing the resilient insert 182. When the operator 48 releases the torsion load being applied, the tapered pin 178 will return to its centered orientation, as illustrated in FIG. 6. The compression characteristics of the material employed for the resilient insert 182, as well as taper dimensions $\theta$ and $\beta$, will define the maximum range of rotation permitted. The applicant believes a nominal rotation range designated "$\alpha$" of ±2.5 degrees is acceptable for certain applications wherein $\theta > \alpha > \beta$. The setting of the rotation limiting device 172 can be varied by applying a tool (not illustrated) within an outwardly opening recess 184 formed in the plug 174 and advancing in inwardly or outwardly as indicated by a bi-directional arrow 186.

Figure 7:
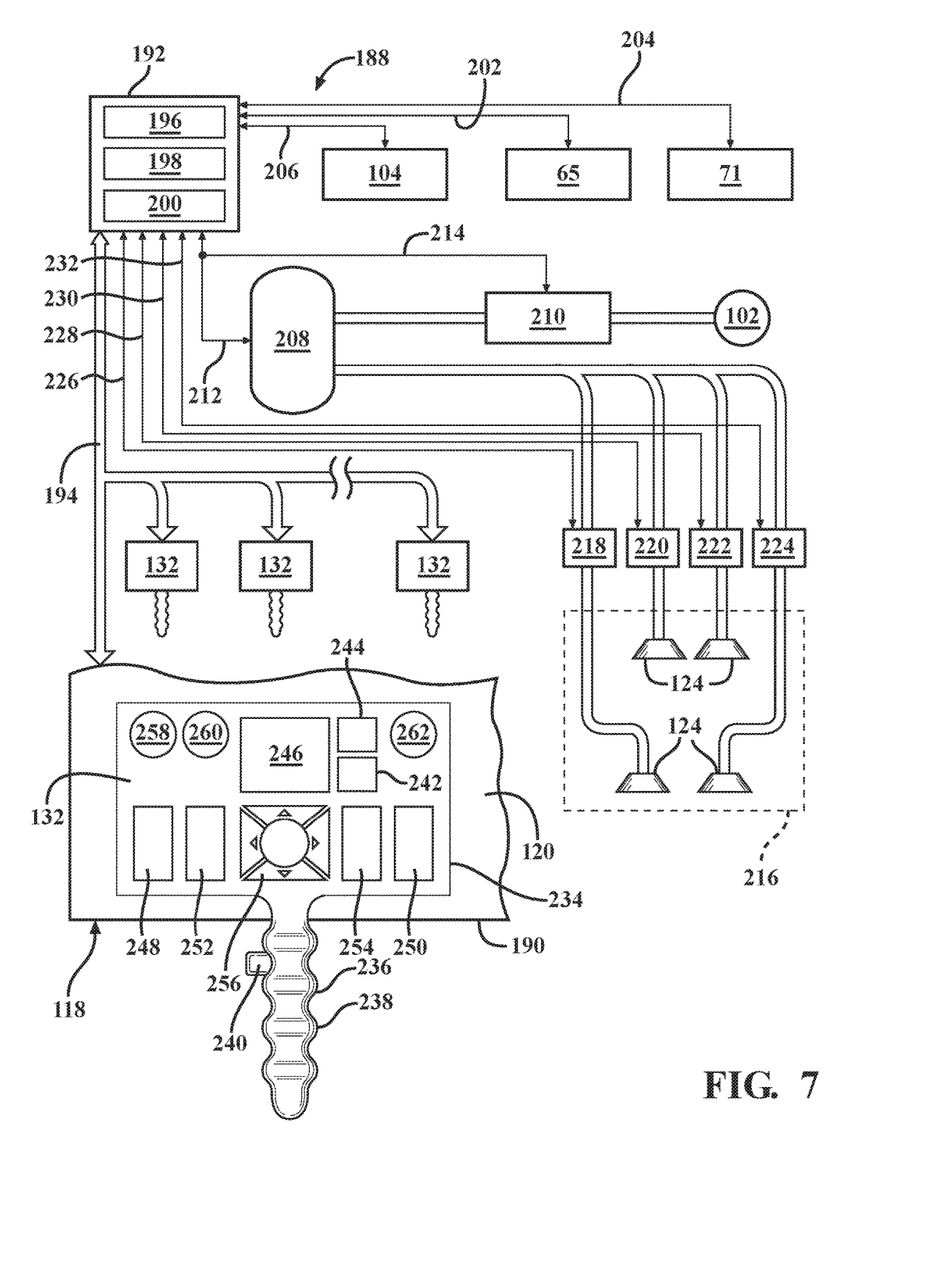
FIG. 7 is schematic diagram of a hybrid electrical/pneumatic controller and operating system for the hoisting device of FIGS. 2-6.

Referring to FIG. 7, a schematic diagram of a controller 188 for operating the overhead traveling hoist system 38 has a plurality of operator input control devices 132 positionally distributed about the peripheral outer edge 190 of the frame member 120 of the object grappler 118. Each operator input device control 132 is interconnected to a computer system 192 via an electrical buss 194. The number of operator input control devices 132 employed can vary as a function of the size of the object grappler 118 and the size of the product elements 40 being transferred thereby. The computer system 192 may include a processor 196, an electrical power controller 198 and a data memory device 200. The computer system 192 has signal feed lines 202, 204 and 206 interconnected to the runway trolley powered traction drive device 65, the bridge trolley powered traction drive device 71 and the self engaging clutch/brake 104, respectively. A vacuum source 208 provides pneumatic power (e.g., vacuum) to the load balancer 102 through a load balancer controller 210. The computer system 192 has signal feed lines 212 and 214 interconnected to the vacuum source 208 and the load balancer controller 210, respectively. The vacuum source 208 also provides pneumatic power (e.g., vacuum) to the array 216 of engagement devices (e.g., vacuum cups) 124 through separate, dedicated vacuum sensor/controllers 218, 220, 222 and 224. The computer system 192 has signal feed lines 226, 228, 230 and 232 interconnected to the dedicated vacuum sensor/controllers 218, 220, 222 and 224, respectively.

Each operator input control device 132 may be configured and function identically to the others. Alternatively, each operator input control device 132 may have differing functionality such as generating a unique identifier signal each time it is manipulated by the operator 48. A typical operator input control device 132 is illustrated on an enlarged scale for the sake of clarity. The operator input control device 132 includes a housing portion 234 preferably mounted to the frame member 120 of the object grappler 118, and a handle portion 236 integrally formed with the housing portion 234 and extending outwardly therefrom to provide a convenient hand-hold for the operator 48 to grasp and manipulate object grappler 118. The operator input control device 132 has a robust design to endure typical, operator induced loading. The handle portion 236 can be ergonomically shaped to provide effective grasping surfaces 238 and can include a "dead-man switch" 240 operative to disable operation of the overhead traveling hoist system 38 when it is not being properly held by an operator 48.

Each operator input control device 132 can incorporate a number of controls, switches and readouts enabling the operator 48 to fully control the overhead traveling hoist system 38 from each operator input device 132. By way of example and not limitation, an operator input control device 132 can include on, off and stop switches 242, 244 and 246, respectively, effecting control of the entire overhead traveling hoist system 38. The operator input control device 132 can include object grappler 118 engage and release controls, and hoisting device 68 lift and lower controls 252 and 254, respectively, and a multi-directional nudge (e.g., joy-stick-type) control 256 operable to enable the operator 48 to effect small lateral and longitudinal micro-positioning movements of the suspended product element 40 as it is lowered into its final design position on the assembly line 44. Each operator input control device 132 can also include readouts such as load engaged, load released and overload indicators 258, 260 and 262, respectively. Although the operator input control device 132 is depicted as including a number of discrete controls, switches and readouts, all of the required inputs and displays can be effected by one or more liquid crystal display (LCD) devices with touch screen capability.

Figure 8:
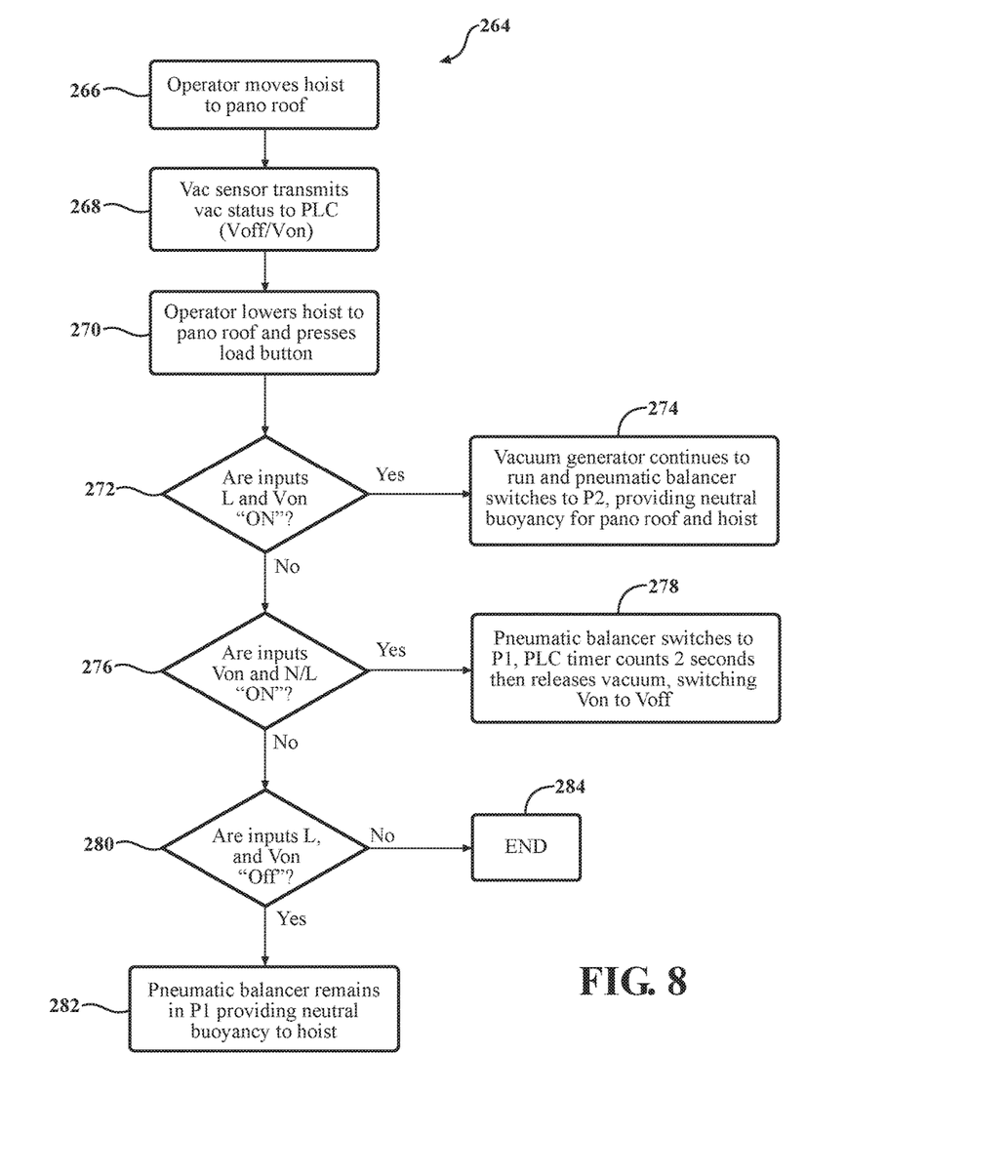
FIG. 8 is an application control logic flow diagram of the hoist system.

Referring to FIG. 8, an application control logic flow diagram 264 of the overhead traveling hoist system 38 commences at step 266 wherein the operator 48 moves the hoisting device 68 to a position over a product element (e.g., a glass panoramic moon roof panel, a.k.a, "pano") 40. Next, at step 268, at least one of the vacuum sensors 218, 220, 222 and 224 transmits a vacuum status signal to the computer system (e.g., a PLC) to confirm if vacuum sensor voltage is "off" (e.g., Voff) or "on" (e.g., Von). If the vacuum sensor voltage is "on", the program proceeds to the next step 270 wherein the operator 48 lowers the hoisting device 68 to the product element 40 and presses a "load" or "engage" button 248. Next, at logic step 272, if inputs "L" (e.g., load) and Von are present, the vacuum generator/source 208 continues to run and the pneumatic load switches to the pressure level balancer 102 (e.g., P2—load air pressure), providing neutral buoyancy for the hoisting device 68 and the product element 40 at step 274. If, however, at logic step 272, if inputs "L" (e.g., load/engage) and Von are not present, the program transitions to the next logic step 276 where if inputs Von and "N/L" (e.g., no load) are present, the pneumatic load balancer 102 switches to pressure level balancer (e.g., P1—no load air pressure), and a computer system 192 timer counts 2 seconds and then releases vacuum, switching Von to Voff at step 278. If, however, inputs Von and "N/L" (e.g., no load) are not present, the program transitions to the next logic step 280. At logic step 280, if inputs "L" and Von are "off", the program moves to step 282 where the pneumatic load balancer 102 remains in P1 providing neutral buoyancy to the hoisting device 68. At logic step 280, if inputs "L" and Von are not "off", the program moves to step 284 terminating the program.

It is to be understood that the present apparatus and method has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The present apparatus and method has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for illustrative purposes and convenience and are not in any way limiting, the present apparatus and method, which is defined by the following claims as interpreted according to the principles of patent law, including the Doctrine of Equivalents, may be practiced otherwise than is specifically described.

The invention claimed is:

1. An overhead traveling hoist system for supplying product elements to an assembly line work station, said hoist system comprising:
   a rail trolley movably engaged with an elongated elevated rail system for controlled bi-directional longitudinal and lateral displacement;
   a hoisting device carried with said rail trolley, said hoisting device including a base member, an object grappler carried with said base member, said object grappler operable to engage and release a product element at an assembly line work station, a linearly expandable structure coupling said rail trolley and said base member, and a hoist drive operative for raising and lowering said base member with respect to said rail trolley;
   a bearing assembly interconnecting said base member and said object grappler for enabling limited relative rotation there between, said bearing assembly including a rotation limiting device operative to limit bi-directional freedom of rotation between said base member and said object grappler, wherein said rotation limiting device is adjustable to vary said bi-directional freedom of rotation between said base member and said object grappler, and a resilient member operative to continuously urge said base member and said object grappler into rotational alignment; and
   a controller, said controller including at least one operator input control device disposed on said base member and/or said object grappler, said at least one operator input control device operable to effect said controlled bi-directional longitudinal and lateral displacement of said rail trolley, operation of said hoist drive and operation of said object grappler.

2. The hoist system of claim 1, further comprising traveling powered traction drive devices operable to drive said rail trolley for said controlled bi-directional longitudinal and lateral displacement in response to actuation of said at least one operator input control device.

3. The hoist system of claim 1, wherein said at least one operator input control device comprises grips for operator manual manipulation of said hoisting device.

4. The hoist system of claim 1, wherein said bearing assembly comprises an upper portion carried by said base member and a lower portion carried by said object grappler, and said rotation limiting device is operative to limit bi-directional freedom of rotation between said upper and lower portions to limit said relative rotation between said base member and said object grappler, and adjustable to vary said bi-directional freedom of rotation between said upper and lower portions to vary said bi-directional freedom of rotation between said base member and said object grappler.

5. An overhead traveling hoist system for supplying product elements to an assembly line work station, said hoist system comprising:
 an elevated rail system including at least one fixed longitudinally extending runway rail, a laterally extending bridge rail carried for controlled bi-directional displacement along said runway rail and a rail trolley carried for controlled bi-directional displacement along said bridge rail;
 a hoisting device carried with said rail trolley, said hoisting device including a base member, an object grappler carried with said base member, said object grappler operable to selectively engage, transport and release product elements between a remote marshaling area and an assembly line work station, a linearly expandable structure coupling said rail trolley and said base member, and a hoist drive operative for raising and lowering said base member with respect to said rail trolley;
 a bearing assembly interconnecting said base member and said object grappler for enabling limited relative rotation there between, said bearing assembly including a rotation limiting device operative to limit bi-directional freedom of rotation between said base member and said object grappler, wherein said rotation limiting device is adjustable to vary said bi-directional freedom of rotation between said base member and said object grappler, and a resilient member operative to continuously urge said base member and said object grappler into rotational alignment; and
 a controller, said controller including at least one operator input control device disposed on said base member and/or said object grappler, said at least one operator input device operable to effect said controlled bi-directional displacement of said bridge rail, said controlled bi-directional displacement of said rail trolley, operation of said hoist drive and operation of said object grappler.

6. The hoist system of claim 5, wherein said at least one operator input control device comprises grips for operator manual manipulation of said hoisting device.

7. The hoist system of claim 5, wherein said at least one operator input control device comprises electric or pneumatic actuators for operator powered manipulation of said hoisting device.

8. The hoist system of claim 5, wherein said bearing assembly comprises an upper portion carried by said base member and a lower portion carried by said object grappler, and said rotation limiting device is operative to limit bi-directional freedom of rotation between said upper and lower portions to limit said relative rotation between said base member and said object grappler, and adjustable to vary said bi-directional freedom of rotation between said upper and lower portions to vary said bi-directional freedom of rotation between said base member and said object grappler.

9. The hoist system of claim 5, wherein said hoist drive comprises a pneumatic load balancer.

10. The hoist system of claim 9, wherein said hoist drive comprises a force multiplying pulley and cable system.

11. The hoist system of claim 10, wherein said force multiplying pulley and cable system comprises a flexible cable secured at one end with said rail trolley, dressed around a moving pulley carried with said base member, dressed around a fixed pulley carried with said rail trolley and terminating about a take-up member of said pneumatic load balancer.

12. The hoist system of claim 5, wherein said hoisting device further comprises an inertia-activated self-engaging clutch operative to deploy an elongated flexible member between said rail trolley and said base member and to engage said clutch wherever downward velocity and/or acceleration of said base member exceeds a respective pre-established set limit therefor.

13. The hoist system of claim 5, further comprising a flexible canopy extending vertically between said rail trolley and said base member to enclose said linearly expandable structure.

14. The hoist system of claim 5, wherein said object grappler comprises an array of vacuum cups pneumatically inter-connected with said controller.

15. The hoist system of claim 5, wherein said product elements are generally planar automobile glass panoramic moon roof panels.

16. The hoist system of claim 5, wherein said elevated rail system comprises a second rail trolley coupling said runway rail and said bridge rail for said controlled bi-directional displacement of said bridge rail.

17. The hoist system of claim 5, wherein said linearly expandable structure comprises a scissors-type structure enabling controlled vertical elongation while preventing longitudinal or lateral sway or torsion of said base member with respect to said rail trolley.

18. The hoist system of claim 5, wherein said at least one operator input control device comprises a plurality of operator input control devices disposed circumferentially about an outer periphery of said base member or said object grappler.

19. An overhead traveling hoist system for supplying product elements to an assembly line work station, said hoist system comprising:
 a rail trolley movably engaged with an elongated elevated rail system for controlled bi-directional longitudinal and lateral displacement;
 a hoisting device carried with said rail trolley, said hoisting device including a base member, an object grappler carried with said base member, said object grappler operable to engage and release a product element at an assembly line work station, a linearly expandable structure coupling said rail trolley and said base member, and a hoist drive operative for raising and lowering said base member with respect to said rail trolley;
 a bearing assembly interconnecting said base member and said object grappler for enabling limited relative rotation there between, said bearing assembly including an upper portion carried by said base member, a lower portion carried by said object grappler and a rotation limiting device, wherein said rotation limiting device is operative to limit bi-directional freedom of rotation between said upper and lower portions to limit said relative rotation between said base member and said object grappler, and adjustable to vary said bi-directional freedom of rotation between said upper and lower portions to vary bi-directional freedom of rotation between said base member and said object grappler; and a controller, said controller including at least one operator input control device disposed on said base member and/or said object grappler, said at least one operator input control device operable to effect said controlled bi-directional longitudinal and lateral displacement of said rail trolley, operation of said hoist drive and operation of said object grappler.

20. The hoist system of claim 19, wherein said bearing assembly comprises a resilient member operative to continuously urge said base member and said object grappler into rotational alignment.

\* \* \* \* \*

UNITED STATES PATENT AND TRADEMARK OFFICE
CERTIFICATE OF CORRECTION

PATENT NO. : 9,688,328 B2  
APPLICATION NO. : 14/326498  
DATED : June 27, 2017  
INVENTOR(S) : Blair C. Perkins Page 1 of 1

It is certified that error appears in the above-identified patent and that said Letters Patent is hereby corrected as shown below:

In the Specification

Column 1, Line 28: "end-ffecor" should be -- end-effector --
Column 1, Line 30: "upward life" should be -- upward lift --
Column 8, Lines 52-53: "operator input device control 132" should be -- operator input control device 132 --

In the Claims

Column 11, Line 56: "input device" should be -- input control device --

Signed and Sealed this  
Thirtieth Day of January, 2018

Joseph Matal  
*Performing the Functions and Duties of the*  
*Under Secretary of Commerce for Intellectual Property and*  
*Director of the United States Patent and Trademark Office*